United States Patent [19]
Müller et al.

[11] Patent Number: 5,236,557
[45] Date of Patent: Aug. 17, 1993

[54] PROCESS FOR PURIFICATION OF AQUEOUS SOLUTIONS CONTAINING HYDROGEN SULFIDE, HYDROGEN CYANIDE, AND AMMONIA

[75] Inventors: Thomas Müller, Dinslaken; Rolf-Dieter Fischer, Oberhausen; Ulrich Gerhardus; Norbert Leder, both of Oberhausen; Klaus Poloszyk, Dorsten; Peter Schneller, Oberhausen; Wolfgang Brunke, Bottrop, all of Fed. Rep. of Germany

[73] Assignee: Hoechst Aktiengesellschaft, Fed. Rep. of Germany

[21] Appl. No.: 810,720

[22] Filed: Dec. 18, 1991

[51] Int. Cl.$^5$ .................................. C02F 1/04
[52] U.S. Cl. ........................... 203/10; 203/34; 203/35; 203/36; 203/37; 203/71; 210/750; 210/903; 210/904
[58] Field of Search ............... 203/10, 33-37, 203/71; 210/750, 752, 766, 903, 904

[56] References Cited

U.S. PATENT DOCUMENTS

| | | | |
|---|---|---|---|
| 4,111,759 | 9/1978 | Didycz et al. | 203/37 |
| 4,160,725 | 7/1979 | Josis et al. | 210/750 |
| 4,260,462 | 4/1981 | Didycz et al. | 203/36 |
| 4,323,430 | 4/1986 | Glassman et al. | 203/36 |
| 4,396,463 | 8/1983 | Josis et al. | 203/10 |
| 4,594,131 | 6/1986 | Maier | 203/37 |
| 4,853,002 | 8/1989 | Niedwiecki et al. | 210/750 |

FOREIGN PATENT DOCUMENTS 2652524 5/1977 Fed. Rep. of Germany .
78504 3/1978 Luxembourg .

Primary Examiner—Thomas Wyse
Attorney, Agent, or Firm—Jordan B. Bierman

[57] ABSTRACT

Aqueous solutions which are contaminated by hydrogen sulfide, hydrogen cyanide, and ammonia are brought to a pH of about 3 or less after their formation and treated with an inert gas in a stripping column to remove the sulfide and cyanide. The pH of the solution is then increased to about 10 or more and the solution is again treated with an inert gas in a second stripping column to remove the ammonia.

21 Claims, 2 Drawing Sheets

PROCESS FOR PURIFICATION OF AQUEOUS SOLUTIONS CONTAINING HYDROGEN SULFIDE, HYDROGEN CYANIDE, AND AMMONIA

This Application claims the benefit of the priority of German Application 40 41 569.4, filed Dec. 22, 1990.

The invention relates to a process for purifying aqueous solutions which contain hydrogen sulfide, hydrogen cyanide, and ammonia in bonded or free form.

BACKGROUND OF THE INVENTION

Condensates and waste water in which relatively large amounts of environmentally harmful impurities are dissolved result from the degassing and gasification of coal. Such aqueous solutions cannot be introduced directly into conventional purification plants, rivers, or other water receivers. Rather, it is necessary for these harmful substances to be removed beforehand, in which case the strict limitations of the environmental legislation regarding maximum harmful substance concentrations must be observed.

The impurities present in solution are organic and inorganic in nature. The organic substances include phenols and other oxygen-containing compounds, such as ketones, aldehydes, carboxylic acids, and nitrogen-containing compounds, such as pyridine derivatives and sulfur compounds. Undesirable inorganic substances which are found in solution are mainly hydrogen sulfide, hydrogen cyanide, and ammonia, which are present as such or in the form of compounds.

It is known that organic substances dissolved in waste water can be extracted with solvents which are immiscible, or miscible to only a small extent, with water. The inorganic impurities are preferably separated off with steam or inert gases, a procedure for which various embodiments have been developed.

Thus, according to DE-B 36 284, hydrogen sulfide and hydrogen cyanide are removed continuously from acid coking plant waste water or similar waste water in a two-stage process by blowing with substantially inert gases, such as air.

DE 22 29 213 C2 describes a process for treating waste water from gasification of coal or degassing of coal which is based on the removal of carbon dioxide, hydrogen sulfide, and ammonia from the solution by means of steam. This publication does not deal with the treatment of waste water containing hydrogen cyanide.

The removal of acid gases, in particular carbon dioxide, sulfur dioxide, hydrogen sulfide, hydrogen cyanide, and their mixtures, as well as free and bonded ammonia, from dilute aqueous solutions is the subject matter of DE 26 52 524 C2. The process comprises a two-stage continuous distillation with stripping steam passed in the counter-current direction.

The processes described lead to significant reductions in the concentrations of harmful substances in aqueous solutions containing these impurities, so that the maximum values permitted by law can be satisfied. However, it has been found that the low cyanide levels initially achieved gradually rise again in contrast to those of the other impurities.

Methods other than distillation and its variants have also been used specifically for the removal of cyanides or hydrogen cyanide from aqueous solutions; chemical processes have proven to be particularly suitable for this purpose. The solutions are treated with hypochlorite, with peroxy compounds, or with ozone; or the cyanides are hydrolyzed at temperatures of 180° C. to more than 200° C. under pressure. One of the oldest chemical processes is based on the reaction of cyanide with iron (II) salts in an alkaline medium. However, even these processes do not always produce the desired result, or they have only limited use for economic reasons.

It is an object of the invention to provide a procedure which eliminates the deficiencies described and enables hydrogen sulfide, hydrogen cyanide, and ammonia to be separated effectively from their aqueous solutions.

SUMMARY OF THE INVENTION

This object is achieved by a process for purifying aqueous solutions containing hydrogen sulfide, hydrogen cyanide, and ammonia by stripping with inert gaseous media, preferably at elevated temperatures. It comprises bringing the aqueous solutions to a pH of about 3 or less, most desirably immediately after the formation of the solutions, removing the hydrogen sulfide and hydrogen cyanide in a first stripping column, subsequently increasing the pH to at least about 10, and removing the ammonia in a second stripping column.

Surprisingly, with the aid of the measures according to the invention, it is possible to remove the impurities mentioned from their solutions in water to the extent that the resulting aqueous phase can be introduced into conventional purification plants or into other water receivers. It is particularly remarkable that no rise in the cyanide concentration is found in the aqueous phase treated. The process according to the invention may prevent the partial reaction of cyanide and sulfide to give thiocyanate, which remains in solution and splits off cyanide again in the course of time. However, this explanation is merely a hypothesis and no experiments have been carried out to confirm it.

Aqueous solutions, regardless of their origin, containing hydrogen sulfide, hydrogen cyanide, and ammonia can be treated by the process according to the invention. However, the process is particularly useful in the treatment of waste water obtained during degassing of coal or gasification of fossil fuels, such as hard coal or crude oil.

DETAILED DESCRIPTION OF THE INVENTION

Before removal of the inorganic compounds, it is advisable to separate out any solids contained in the solutions (such as carbon black), for example by filtration or sedimentation, and any organic compounds contained in the solutions, for example by extraction with a solvent which is immiscible with water.

When the novel process is carried out in practice, the aqueous solutions are distilled in two separate successive stages. It is an essential feature of the invention that the aqueous solutions are acidified strongly in the first stage, i.e. to a pH of about 3 or less. Since the solutions are usually weakly acid, neutral, or alkaline, corresponding amounts of an acid are added. Strong inorganic acids are suitable, and sulfuric acid or nitric acid is preferred. It has proven to be particularly suitable to add the acid to the solutions at a very early stage, advantageously immediately after they are formed, i.e. without intermediate storage. This ensures that the critical solution constituents of sulfide and cyanide do not react to give compounds which cannot be removed by stripping. It goes without saying that cyanides and sulfides are converted into the corresponding hydrogen compounds by the addition of acid.

The gaseous compounds hydrogen sulfide and hydrogen cyanide contained in the strongly acid solutions are removed by stripping in a stripping column using a gaseous medium which is inert—or at least largely inert—under the operating conditions chosen and which is blown into the bottom of the column. Air and, in particular, steam have proven to be suitable inert gaseous media. The steam is preferably generated by evaporating some of the aqueous solution, so that the total amount of waste water is not increased. The distillation is carried out at temperatures between about 60° C. and 150° C., in particular between 80° C. to 120° C., and under pressures of 0.02 to 0.5 MPa, preferably 0.05 to 0.12 MPa. During the distillation, it should be ensured that the pH of the solution is not permitted to rise.

The amount of stripping gas depends on the concentration of the impurities in the aqueous solution and on the amount of solution to be treated, and is chosen so that the residual amounts of hydrogen cyanide and hydrogen sulfide contained in the purified waste water can be tolerated. Either packed columns or plate columns, for example bubble perforated or valve plate columns, can be employed, depending on the operating conditions specified and the amount of substance present. The number of plates in the separating column has a considerable influence on the stripping result. It has been found that particularly good separation results are achieved if the column has 1 to 30, in particular 6 to 12, theoretical plates. The overhead from the stripping column is condensed partially or completely and recycled to the head of the column, and the gaseous constituents of the mixture are permitted to exit the column.

The bottom product of the first stripping column is brought to a pH of at least 10 by addition of alkaline substances. Alkali metal hydroxides, in particular sodium hydroxide, as well as calcium oxide or hydroxide, which is preferred, can be used as alkaline reagents. In a second stripping column, the alkaline solution is in turn distilled, using as the stripping medium a gas which is inert or virtually inert under the operating conditions. Air and, in particular, steam, which has preferably been obtained from the waste water, are successfully employed as inert gases. The distillation temperatures are between about 60° C. and about 150° C., 80° C. to 120° C. being preferred, and the pressure is 0.02 to 0.5 MPa, in particular 0.05 to 0.12 MPa. As in the first stage, the amount of stripping gas depends on the concentration of the impurity, i.e. the ammonia, and on the amount of waste water. In this process step also, packed columns or plate columns are suitable for the distillation. The separation effect is particularly favorable if columns having 5 to 50, in particular 6 to 20, theoretical plates are used. As in the first distillation stage, the overhead is condensed partially or completely. The condensate is recycled to the head of the column and the gaseous content, the ammonia, exits the column.

The gaseous streams, the hydrogen sulfide and hydrogen cyanide from the first stage and the ammonia from the second stage, are further processed in known manner, for example by absorption or combustion. In a preferred embodiment of the process according to the invention, the combustion is oarried out catalytically, for example in a Claus plant.

The solutions treated by this novel procedure contain, per liter, less than 1 mg of $H_2S$, less than 5 mg of easily liberated HCN (i.e. HCN from cyanides), and not more than 10 mg of $NH_3$. They can, therefore, be introduced into the customary purification plants and also into rivers without further measures.

BRIEF DESCRIPTION OF THE DRAWINGS

Two embodiments of the process according to the invention are shown in FIGS. 1 and 2. In the embodiment according to FIG. 1, the dissolved gaseous compounds are removed by stripping with steam, and in the embodiment according to FIG. 2 they are removed with the aid of another inert gaseous medium, for example air. In both cases, the apparatus essentially comprises stripping columns 1 and 2.

Polluted waste water is brought to a pH of 3 or less by addition of an acid reagent via line 12, and passed, by means of pump 7 via line 11, to preheater 8, where it is heated almost to its boiling point, and then via line 13 to head 14 of column 1. The waste water flows from head 14 over column baffles 9 to the column bottom. Some of the water is evaporated in heater 3. The steam is passed via a line 17 countercurrently to the waste water to column head 14 and further to condenser 5. The steam removes the hydrogen sulfide and hydrogen cyanide impurities dissolved in the waste water. The steam which is condensed and the gases which escape are separated from one another in condenser 5. The steam condensate is recycled via line 16 to head 14 of the column and the gases exit via line 15.

Figure 1:
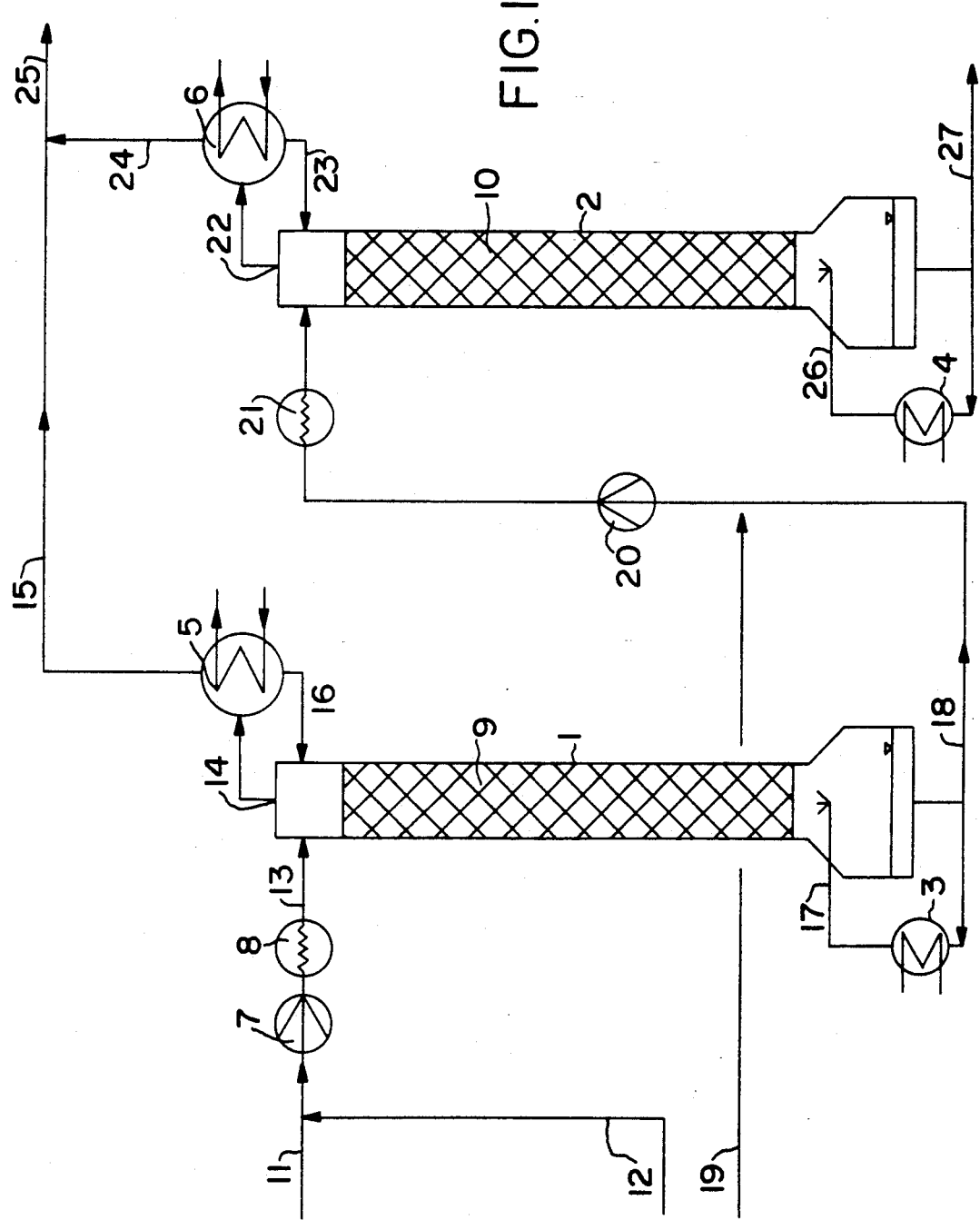

The waste water polluted essentially with the starting amount of ammonia and residual cyanides is removed at the bottom of column 1 via line 18 and brought to a pH of 10 or more by addition of an alkaline reagent via line 19. The waste water is conveyed with the aid of pump 20 into heater 21 and is there heated again almost to the boiling point, and introduced at head 22 of column 2. Column 2 is operated in a manner corresponding to that of column 1. Steam which has been generated by indirect heating of some of the waste water in heater 4 if passed via line 26 countercurrently to the water flowing downward over column baffles 10. Ammonia dissolved in the waste water and a further portion of the cyanides are stripped by this procedure. The mixture of ammonia and steam is cooled in condenser 6 such that only the steam condenses. This is recycled via line 23 to head 22 of column 2. Ammonia is passed via line 24 to waste gas collection line 25, through which it passes, together with the residual hydrogen sulfide and hydrogen cyanide, to, for example, a waste gas treatment unit, such as a Claus plant.

The purified waste water is removed at the bottom of column 2 via line 27 and can be introduced into customary purification plants and also into rivers without further measures.

The operating pressures in columns 1 and 2 and, therefore, the boiling points can be varied within wide limits. It is therefore possible, for better utilization of energy, to operate column 2 at a lower pressure than column 1. The heat of condensation of the steam of column 1 can then be used for indirect heating of the bottom of column 2 by combining condenser 5 and heater 4 into a single heat exchanger.

Figure 2:
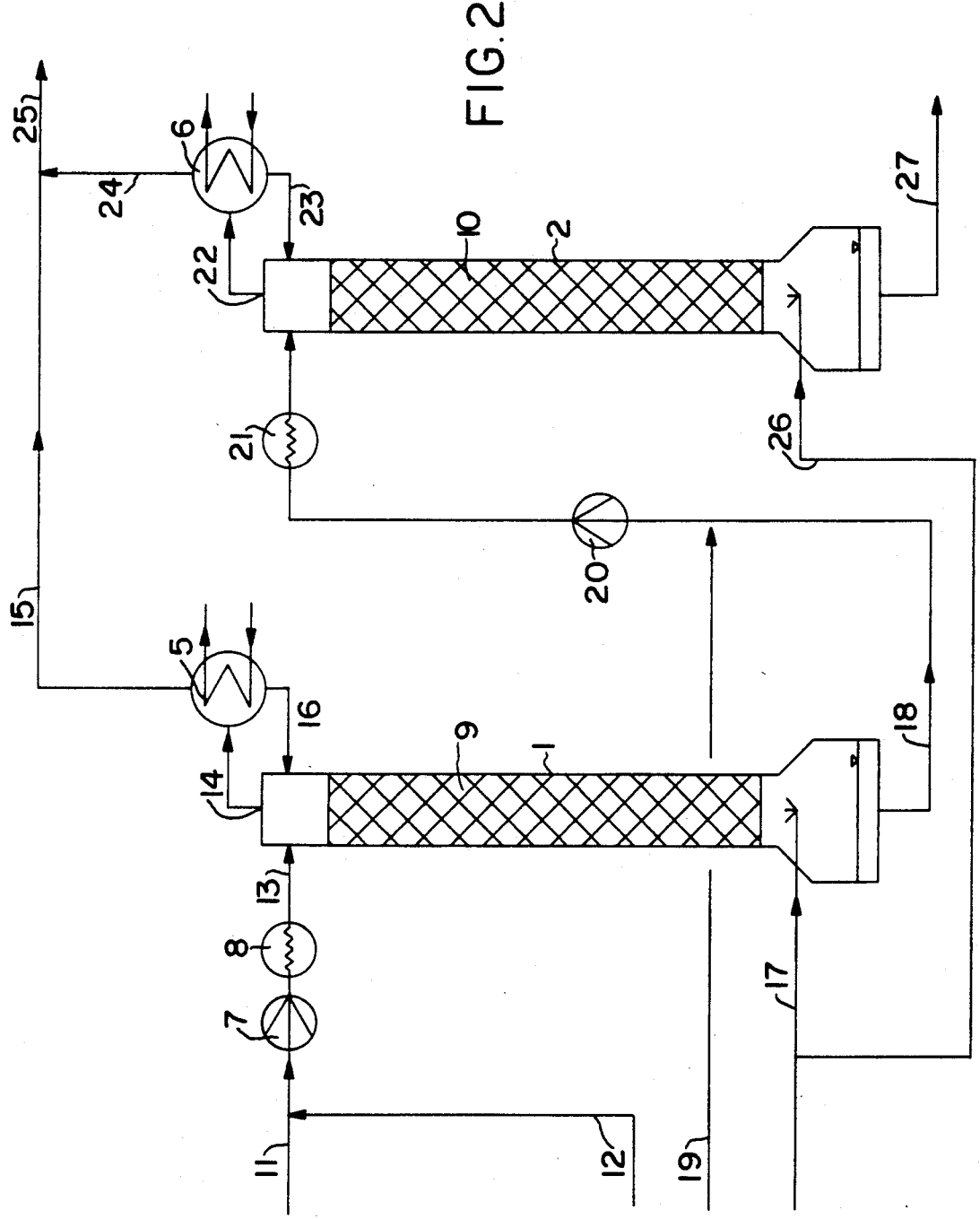

In the embodiment of the invention as shown in FIG. 2, it is not steam which has been obtained by evaporation of some of the waste water which is used for driving out the ammonia, hydrogen sulfide, and hydrogen cyanide, but another gaseous medium, for example air, which flows into columns 1 and 2 via lines 17 and 26, respectively.

The novel process is illustrated by the following Examples, but is not limited thereby.

EXAMPLE 1

4.3 m$^3$ of waste water/hour, containing, per liter, 117 mg of NH$_3$, 211 mg of H$_2$S, and 503 mg of HCN in the form of salts and having a pH of 5.9, is introduced into the apparatus of FIG. 1. A pH of 3 is established by addition of 240 g of 100% H$_2$SO$_4$ per m$^3$ of waste water. The waste water is heated to 95° C. in preheater 8 and introduced at head 14 of column 1. About 10% by weight of the waste water is evaporated in heater 3 in the bottom of column 1. The steam is passed countercurrently to the waste water to head 14 of column 1, which is operated under a pressure of 0.1 MPa. For condensation of the steam, the overhead product is cooled to about 85° C. in condenser 5. The steam is recycled to head 14 of column 1, and the aqueous constituents of the condensate are passed to the waste gas treatment unit. The bottom product of column 1 still contains about 0.2 mg of H$_2$S/liter and about 7 mg of HCN/liter, as well as the total amount of NH$_3$ in the form of salts.

By addition of 340 g of NaOH per m$^3$ of bottom product, the pH thereof is increased to 10. The waste water is heated to about 95° C. in heater 21 and passed to head 22 of column 2 which, like column 1, is operated under a pressure of 0.1 MPa. About 10% by weight of the bottom product of column 1 is evaporated in heater 4 and passed countercurrently to the aqueous phase from head 22. The product obtained at column head 22 is cooled to 85° C. in condenser 6 to condense out the water, which is recycled via line 23 to head 22. The gaseous content of the condensate, essentially ammonia, is passed, together with the waste gas, from column 1 to the waste gas treatment unit (not shown). 4.3 m$^3$ of waste water/hour, which still contains, per liter, 4.1 mg of NH$_3$, 0.2 mg of H$_2$S, and 3.3 mg of HCN in the form of salts, is obtained at the bottom of column 2.

EXAMPLE 2

Example 1 is repeated with waste water which contains, per liter, 328 mg of NH$_3$, 160 mg of H$_2$S, and 423 mg of HCN in the form of salts. The pH is brought to 3 by addition of 97 g of 100% H$_2$SO$_4$ per m$^3$ of waste water. The product obtained at the bottom of column 1 after treatment of the waste water as described in Example 1 still contains, per liter, about 0.2 mg of H$_2$S, 4.0 mg of HCN, and the total starting amount of NH$_3$ as salts. 1030 g of NaOH/m$^3$ are added to the bottom product, so that a pH of 11 is established. The subsequent procedure is as described in Example 1. 4.3 m$^3$ of waste water containing, per liter, 3.0 mg of NH$_3$, 0.6 mg of H$_2$S, and 1.9 mg of HCN as salts are obtained per hour at the bottom of column 2.

What we claim is:

1. A process for the purification of an aqueous solution containing hydrogen sulfide, hydrogen cyanide, and ammonia comprising adding an acidic compound to said aqueous solution in an amount sufficient to bring said aqueous solution to a first pH of not more than about 3.0 after formation of said aqueous solution, passing said solution through a first stripping column, contacting said solution with a first inert gaseous medium, thereby removing at least most of said sulfide and cyanide to form a partially stripped solution, adding an alkaline compound to said stripped solution sufficient to bring said stripped solution to a second pH of at least about 10.0, passing said stripped solution through a second stripping column, contacting said stripped solution with a second inert gaseous medium, thereby removing at least most of said ammonia to form a waste water solution.

2. The process of claim 1 wherein said aqueous solution has contacted by said first inert gaseous medium at a first elevated temperature.

3. The process of claim 1 wherein said stripped solution is contacted by said second inert gaseous medium at a second elevated temperature.

4. The process of claim 1 wherein said acidic compound is a strong inorganic acid.

5. The process of claim 4 wherein said acid is sulfuric or nitric.

6. The process of claim 1 wherein said aqueous solution is contacted by said first medium and said stripped solution is contacted by said second medium at a stripping temperature of 60° C. to 150° C.

7. The process of claim 6 wherein said stripping temperature is 80° C. to 120° C.

8. The process of claim 1 wherein said aqueous solution is contacted by said first medium and said stripped solution is contacted by said second medium at a stripping pressure of 0.02 to 0.5 MPa.

9. The process of claim 8 wherein said stripping pressure is 0.05 to 0.12 MPa.

10. The process of claim 1 wherein said first stripping column has 1 to 30 theoretical plates.

11. The process of claim 10 wherein said first stripping column has 6 to 12 theoretical plates.

12. The process of claim 1 wherein said second column has 5 to 50 theoretical plates.

13. The process of claim 12 wherein said second column has 6 to 20 theoretical plates.

14. The process of claim 1 wherein said first medium and said second medium are individually steam or air.

15. The process of claim 14 wherein said first medium and said second medium are steam.

16. The process of claim 1 wherein said alkaline compound is selected from the group consisting of alkali metal hydroxides, calcium oxide, and calcium hydroxide.

17. The process of claim 16 wherein said alkaline compound is sodium hydroxide, calcium oxide, or calcium hydroxide.

18. The process of claim 15 wherein said steam is generated by heating said aqueous solution and/or said stripped solution.

19. The process of claim 1 wherein a first overhead product emerges from the head of said first column, said first product being condensed and recycled to said head of said first column.

20. The process of claim 1 wherein a second overhead product emerges from the head of said second column, said second product being condensed and recycled to said head of said second column.

21. The process of claim 1 wherein said aqueous solution is brought to said first pH without intermediate storage of said solution.

* * * * *